(No Model.)
T. K. WEBSTER & J. CHIVILL.
SCREW CONVEYER COUPLING.
No. 272,006. Patented Feb. 6, 1883.
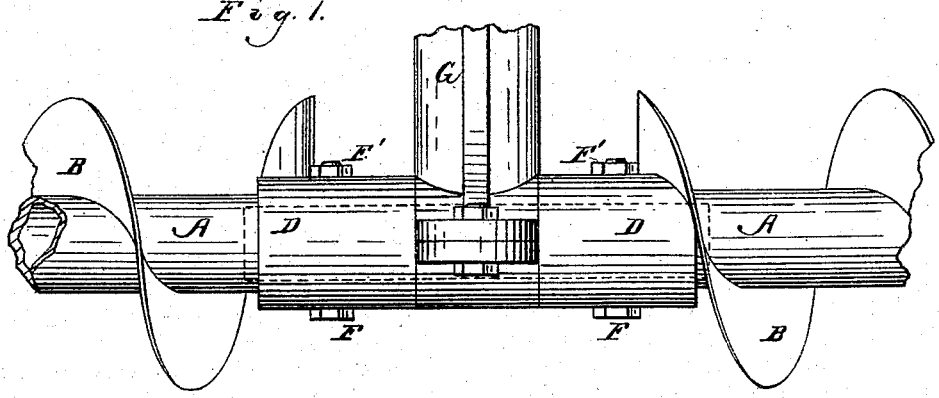
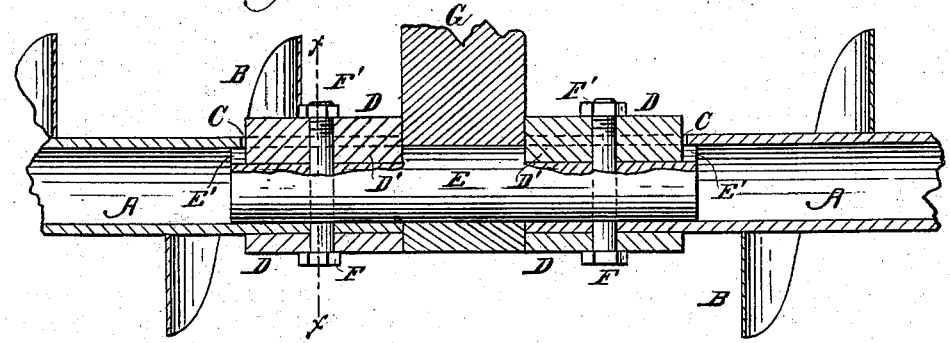
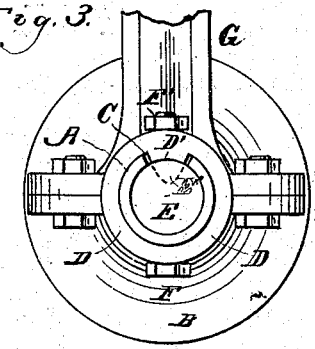
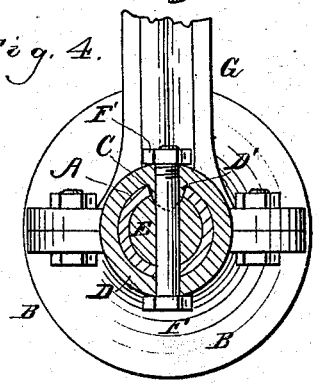
Witnesses.
Inventor.
Towner K. Webster,
John Chivill,
per Gridley & Co.
their Attorneys

UNITED STATES PATENT OFFICE.

TOWNER K. WEBSTER AND JOHN CHIVILL, OF CHICAGO, ILL., ASSIGNORS TO WEBSTER & COMSTOCK MANUFACTURING COMPANY, OF SAME PLACE.

SCREW-CONVEYER COUPLING.

SPECIFICATION forming part of Letters Patent No. 272,006, dated February 6, 1883.

Application filed December 26, 1882. (No model.)

*To all whom it may concern:*

Be it known that we, TOWNER K. WEBSTER and JOHN CHIVILL, of Chicago, in the county of Cook and State of Illinois, have invented certain new and useful Improvements in Screw-Conveyer Couplings, of which the following, in connection with the accompanying drawings, is a specification.

In the drawings, Figure 1 is a side view of a screw-conveyer coupling embodying our invention. Fig. 2 is a central longitudinal vertical section thereof. Fig. 3 is an end view of the same, and Fig. 4 is a section in the plane of the line $x\ x$ of Fig. 2.

Like letters of reference indicate like parts.

Screw-conveyers are usually constructed in sections, which are connected together for use by means of bolt-couplings. The conveyer-shafts are usually hollow or tubular, and the ends of these tubular sections have been reenforced by means of collars or ferrules. Cylindrical plugs have also been inserted into the adjacent ends of the tubular sections, a plug passing from the end of one section into the end of the next section, and serving as a journal for supporting the conveyer in hangers. Bolts have passed through these collars, tubular sections, and plugs for the purpose of securely connecting all the parts together for work. An objectionable feature in screw-conveyers coupled in this manner is that as there is a twisting strain produced by the movement of the conveyer this strain is felt by the bolts, and frequently to such an extent as to cause them to wear through the pipe and thus break or impair the connection of the sections. We aim to obviate this objection by making in the ends of each section a comparatively deep or long cut or slot, and by making on each collar or ferrule an inwardly-projecting rib or feather adapted to enter the said cuts or slots in the ends of the tubular sections. We also make corresponding grooves at the ends of the coupling plugs or cores, all of which will be hereinafter more fully explained.

In the drawings, A A represent the tubular sections, and B B are the screw-flanges thereon.

C C are the cuts or slots in the ends of the sections A A.

D D are the collars or ferrules applied to the ends of the said sections, and D' D' are the inwardly-projecting ribs or feathers on the said ferrules.

E is the coupling plug or core, which we make, by preference, of steel, and E' E' are grooves at the ends thereof. The ribs D' D' pass through the cuts or slots C C and enter the grooves E' E', as shown.

F F are bolts passing through the ferrules D D, through the feathers D' D', and through the plug E, and F' F' are nuts on the said bolts.

G is the hanger for supporting the conveyer, and the plugs E E rotate or turn in these hangers with the conveyer-shaft.

It will be perceived from the foregoing description and from reference to the drawings that the ribs or feathers D' D' take the torsional or twisting strain resulting from the rotation of the conveyer and the resistance offered in doing work, and that the bolts are thereby relieved of this strain, and thereby prevented from cutting the tubular sections.

Having thus described our invention, what we claim as new, and desire to secure by Letters Patent, is—

The combination of the tubular sections A A, having therein the cuts or slots C C, the collars or ferrules D D, having thereon the internal ribs or feathers, D' D', the plug or core E, having therein the grooves E' E', and the bolts and nuts, all adapted for arrangement together substantially as described, and for the purposes set forth.

TOWNER K. WEBSTER.
JOHN CHIVILL.

Witnesses:
N. COWLES,
J. H. AVERY.